(12) United States Patent
Schuster et al.

(10) Patent No.: US 7,472,868 B2
(45) Date of Patent: Jan. 6, 2009

(54) SYSTEMS AND METHODS FOR CONTROLLING AN AERIAL REFUELING DEVICE

(75) Inventors: John H. Schuster, Seattle, WA (US); Ed Feltrop, Seattle, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 11/217,696

(22) Filed: Sep. 1, 2005

(65) Prior Publication Data

US 2007/0215753 A1  Sep. 20, 2007

(51) Int. Cl.
B64D 37/00 (2006.01)
(52) U.S. Cl. .................................... 244/135 A
(58) Field of Classification Search ............. 244/135 A, 244/135 R, 1 TD
See application file for complete search history.

(56) References Cited

U.S. PATENT DOCUMENTS

| | | | |
|---|---|---|---|
| 724,675 A | 4/1903 | Decker | |
| 2,091,916 A | 8/1937 | Evans | |
| 2,213,680 A | 9/1940 | Barnett | |
| 2,414,509 A | 1/1947 | Andre | |
| 2,453,553 A | 11/1948 | Tansley | |
| 2,475,635 A | 7/1949 | Parsons | |
| 2,552,991 A | 5/1951 | McWhorter | |
| 2,668,066 A | 2/1954 | Stadelhofer | |
| 2,670,913 A | 3/1954 | Castor et al. | |
| 2,859,002 A | 11/1958 | Leisy | |
| 2,879,017 A * | 3/1959 | Smith | 244/135 A |
| 2,919,937 A | 1/1960 | Dovey | |
| 2,953,332 A | 9/1960 | Cobham et al. | |
| 2,960,295 A | 11/1960 | Schulz | |
| 2,967,684 A * | 1/1961 | Knecht | 244/136 |
| 2,973,171 A | 2/1961 | Ward et al. | |
| 3,091,419 A | 5/1963 | Mosher | |
| 3,747,873 A | 7/1973 | Layer et al. | |
| 3,836,117 A | 9/1974 | Panicall | |
| 3,928,903 A | 12/1975 | Richardson et al. | |
| 4,044,834 A | 8/1977 | Perkins | |
| 4,072,283 A | 2/1978 | Weiland | |
| 4,095,761 A | 6/1978 | Anderson et al. | |

(Continued)

FOREIGN PATENT DOCUMENTS

DE  27 44 674 A1  4/1979

(Continued)

OTHER PUBLICATIONS

U.S. Appl. No. 10/857,226, Schroeder.

(Continued)

*Primary Examiner*—John W Eldred
(74) *Attorney, Agent, or Firm*—Perkins Coie LLP

(57) ABSTRACT

Systems and methods for refueling aircraft in flight are disclosed herein. An aerial refueling system in accordance with one aspect of the invention includes a movable aerial refueling boom configured to be carried by an aerial refueling aircraft. The system can also include two or more actuators operably coupled to the boom to control motion of the boom relative to the refueling aircraft. In several embodiments, the boom does not include any boom aerodynamic control surfaces to control motion of the boom relative to the refueling aircraft.

21 Claims, 5 Drawing Sheets

U.S. PATENT DOCUMENTS

| | | | |
|---|---|---|---|
| 4,119,294 A | 10/1978 | Schnorrenberg | |
| 4,129,270 A * | 12/1978 | Robinson et al. | 244/135 A |
| 4,149,739 A | 4/1979 | Morris | |
| 4,150,803 A | 4/1979 | Fernandez | |
| 4,231,536 A | 11/1980 | Ishimitsu et al. | |
| 4,236,686 A * | 12/1980 | Barthelme et al. | 244/116 |
| 4,327,784 A * | 5/1982 | Denniston | 141/387 |
| 4,408,943 A * | 10/1983 | McTamaney et al. | 137/899.2 |
| 4,438,793 A | 3/1984 | Brown | |
| 4,471,809 A | 9/1984 | Thomsen et al. | |
| 4,477,040 A | 10/1984 | Karanik | |
| 4,534,384 A | 8/1985 | Graham et al. | |
| 4,540,144 A | 9/1985 | Perrella | |
| 4,586,683 A | 5/1986 | Kerker | |
| 4,665,936 A | 5/1987 | Furrer | |
| H297 H * | 7/1987 | Schultz | 141/232 |
| 4,717,099 A | 1/1988 | Hubbard | |
| 4,796,838 A | 1/1989 | Yamamoto | |
| 4,883,102 A | 11/1989 | Gabrielyan et al. | |
| 4,929,000 A | 5/1990 | Annestedt, Sr. | |
| 5,131,438 A | 7/1992 | Loucks | |
| 5,141,178 A | 8/1992 | Alden et al. | |
| 5,255,877 A | 10/1993 | Lindgren et al. | |
| 5,393,015 A | 2/1995 | Piasecki | |
| 5,427,333 A | 6/1995 | Kirkland | |
| 5,449,203 A | 9/1995 | Sharp | |
| 5,449,204 A | 9/1995 | Greene et al. | |
| 5,530,650 A | 6/1996 | Biferno et al. | |
| 5,539,624 A | 7/1996 | Dougherty | |
| 5,573,206 A | 11/1996 | Ward | |
| 5,785,276 A | 7/1998 | Ruzicka | |
| 5,810,292 A | 9/1998 | Garcia, Jr. et al. | |
| 5,904,729 A | 5/1999 | Ruzicka | |
| 5,906,336 A | 5/1999 | Eckstein | |
| 5,921,294 A | 7/1999 | Greenhalgh et al. | |
| 5,996,939 A | 12/1999 | Higgs et al. | |
| 6,076,555 A | 6/2000 | Hettinger | |
| 6,119,981 A | 9/2000 | Young et al. | |
| 6,145,788 A | 11/2000 | Mouskis et al. | |
| 6,302,448 B1 | 10/2001 | Van Der Meer et al. | |
| 6,305,336 B1 | 10/2001 | Hara et al. | |
| 6,324,295 B1 | 11/2001 | Valery et al. | |
| 6,326,873 B1 | 12/2001 | Faria | |
| 6,375,123 B1 | 4/2002 | Greenhalgh et al. | |
| 6,428,054 B1 | 8/2002 | Zappa et al. | |
| 6,454,212 B1 | 9/2002 | Bartov | |
| 6,464,173 B1 | 10/2002 | Bandak | |
| 6,467,725 B1 | 10/2002 | Coles et al. | |
| 6,588,465 B1 | 7/2003 | Kirkland et al. | |
| 6,598,830 B1 | 7/2003 | Ambrose et al. | |
| 6,601,800 B2 | 8/2003 | Ollar | |
| 6,604,711 B1 | 8/2003 | Stevens et al. | |
| 6,651,933 B1 | 11/2003 | von Thal et al. | |
| 6,669,145 B1 | 12/2003 | Green | |
| 6,676,379 B2 | 1/2004 | Eccles et al. | |
| 6,752,357 B2 | 6/2004 | Thal et al. | |
| 6,779,758 B2 | 8/2004 | Vu et al. | |
| 6,796,527 B1 | 9/2004 | Munoz et al. | |
| 6,819,982 B2 | 11/2004 | Doane | |
| 6,824,105 B2 | 11/2004 | Edwards et al. | |
| 6,832,743 B2 | 12/2004 | Schneider et al. | |
| 6,837,462 B2 | 1/2005 | von Thal et al. | |
| 6,838,720 B2 | 1/2005 | Krieger et al. | |
| 6,848,720 B2 | 2/2005 | Carns et al. | |
| 2003/0038214 A1 | 2/2003 | Bartov | |
| 2003/0097658 A1 | 5/2003 | Richards | |
| 2003/0136874 A1 | 7/2003 | Gjerdrum | |
| 2004/0129865 A1 | 7/2004 | Doane | |
| 2005/0055143 A1 | 3/2005 | Doane | |
| 2006/0071475 A1 | 4/2006 | James et al. | |
| 2006/0278759 A1 | 12/2006 | Carns et al. | |
| 2006/0284018 A1 | 12/2006 | Carns et al. | |
| 2006/0284019 A1 | 12/2006 | Takacs et al. | |

FOREIGN PATENT DOCUMENTS

| | | |
|---|---|---|
| DE | 29901583 | 5/1999 |
| DE | 10013751 | 10/2001 |
| EP | 0780292 | 6/1997 |
| EP | 0807577 | 11/1997 |
| EP | 1094001 | 4/2001 |
| EP | 1361156 | 11/2003 |
| EP | 1695911 | 8/2006 |
| GB | 555984 | 9/1943 |
| GB | 2257458 | 1/1993 |
| GB | 2373488 | 9/2002 |
| GB | 2 405 384 | 3/2005 |
| IT | 128459 | 5/2003 |
| RU | 2111154 | 5/1998 |
| RU | 2140381 | 10/1999 |
| RU | 2142897 | 12/1999 |
| SU | 673798 | 7/1979 |
| SU | 953345 | 8/1982 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02/076826 | 10/2002 |
| WO | WO-03/102509 | 12/2003 |

OTHER PUBLICATIONS

U.S. Appl. No. 10/890,664, Schroeder.
U.S. Appl. No. 10/896,584, Schroeder.
U.S. Appl. No. 11/067,331, Crangle.
U.S. Appl. No. 11/078,210, Smith.
U.S. Appl. No. 11/090,347, Speer.
U.S. Appl. No. 11/157,245, Takacs et al.
Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German, (5 pgs).
Thales Avionics Ltd., "Air Tanker Bids for Future Strategic Tanker Aircraft," Jul. 3, 2001; www.thalesavionics.net/press/pr43.html; (3 pgs).
Keller, George R., "Hydraulic System Analysis", pp. 40-41, 1985, Hydraulics & Pheumatics, Cleveland, Ohio.
European Search Report for Application No. EP06254568; The Boeing Company; 8 pgs; Nov. 5, 2007; European Patent Office.

* cited by examiner

SYSTEMS AND METHODS FOR CONTROLLING AN AERIAL REFUELING DEVICE

TECHNICAL FIELD

The present invention is directed generally toward systems and methods for controlling an aerial refueling device, including aerial refueling booms.

BACKGROUND

In-flight refueling (or air-to-air refueling) is an important method for extending the range of aircraft traveling long distances over areas having no feasible landing or refueling points. Although in-flight refueling is a relatively common operation, especially for military aircraft, the aircraft to be refueled (e.g., the receiver aircraft) must be precisely positioned relative to the tanker aircraft in order to provide safe engagement while the fuel is dispensed to the receiver aircraft. The requirement for precise relative spatial positioning of the two rapidly moving aircraft makes in-flight refueling a challenging operation.

There are currently two primary systems for in-flight refueling. One is a hose and drogue system in which a refueling hose having a drogue disposed at one end is trailed behind the tanker aircraft and is engaged by the receiver aircraft. Another system is a boom refueling system. The boom refueling system typically includes a rigid boom extending from the tanker aircraft, with a probe and nozzle at its distal end. The boom also includes boom aerodynamic control surfaces or airfoils (e.g., ruddevators, horizontal and vertical surfaces, and/or flow control surfaces) controlled by a boom operator stationed on the tanker aircraft. The boom aerodynamic control surfaces allow the operator to maneuver the boom with respect to the receiver aircraft. Accordingly, the receiver aircraft is first maneuvered into an in-flight refueling position below and aft of the tanker aircraft. The boom operator then controls the boom aerodynamic control surfaces to position the boom and mate the refueling nozzle with a refueling connection on the receiver aircraft.

In order to accommodate the inevitable relative motion between the tanker aircraft and the receiver aircraft, the refueling boom must be movable, both vertically and laterally. One drawback with using the boom aerodynamic control surfaces to control movement of the boom is that the effectiveness of the aerodynamic control surfaces can be reduced significantly during certain operating conditions (e.g., large lateral deflections and at high Mach numbers). Accordingly, the size of the refueling envelope can be limited. Another drawback associated with boom aerodynamic control surfaces is that such structures require extensive wind tunnel testing and control system development to ensure that the control surfaces provide adequate control of the refueling boom at a variety of operating conditions. Still another drawback with boom aerodynamic control surfaces is that such structures can potentially contact the receiver aircraft during refueling and cause significant damage to the receiver aircraft, the tanker aircraft, and/or the refueling boom itself.

SUMMARY

The following summary is provided for the benefit of the reader only, and does not limit the invention as set forth in the claims. Aspects of the present invention are directed toward systems and methods for refueling aircraft in flight. An aerial refueling system in accordance with one aspect of the invention includes a movable aerial refueling boom configured to be carried by an aerial refueling aircraft. The system can also include two or more actuators operably coupled to the boom to control motion of the boom relative to the refueling aircraft.

In further particular aspects of the invention, the boom does not include any boom aerodynamic control surfaces such that the motion of the boom relative to the refueling aircraft is generally controlled by the two or more actuators. Additionally, the boom can be carried by a boom support that is operably coupled to the refueling aircraft. The actuators can be operably coupled to at least one of the boom and the boom support to move the boom about a first axis (e.g., a yaw axis) and a second axis generally normal to the first axis (e.g., a pitch axis).

An aerial refueling system in accordance with another embodiment of the invention includes a tanker aircraft and a boom mounting assembly carried by the tanker aircraft. The boom mounting assembly can include a boom support. The system also includes a movable aerial refueling boom carried by at least one of the boom support and the tanker aircraft. The boom does not include a boom airfoil. The system further includes one or more actuators operably coupled to at least one of the boom support and the boom to control motion of the boom relative to the tanker aircraft.

Further aspects of the invention are directed to methods for refueling aircraft in flight. One such method includes deploying a generally rigid aerial refueling boom without a boom airfoil from a refueling aircraft. The method further includes controlling a position of the boom relative to the refueling aircraft by controlling one or more actuators operably coupled to the boom. In one particular aspect of several methods of the invention, the motion of the boom relative to the refueling aircraft is controlled without the use of any boom aerodynamic control surfaces.

DETAILED DESCRIPTION

The present disclosure describes systems and methods for controlling an aerial refueling device used for aircraft refueling. Certain specific details are set forth in the following description and in FIGS. 1-4 to provide a thorough understanding of various embodiments of the invention. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
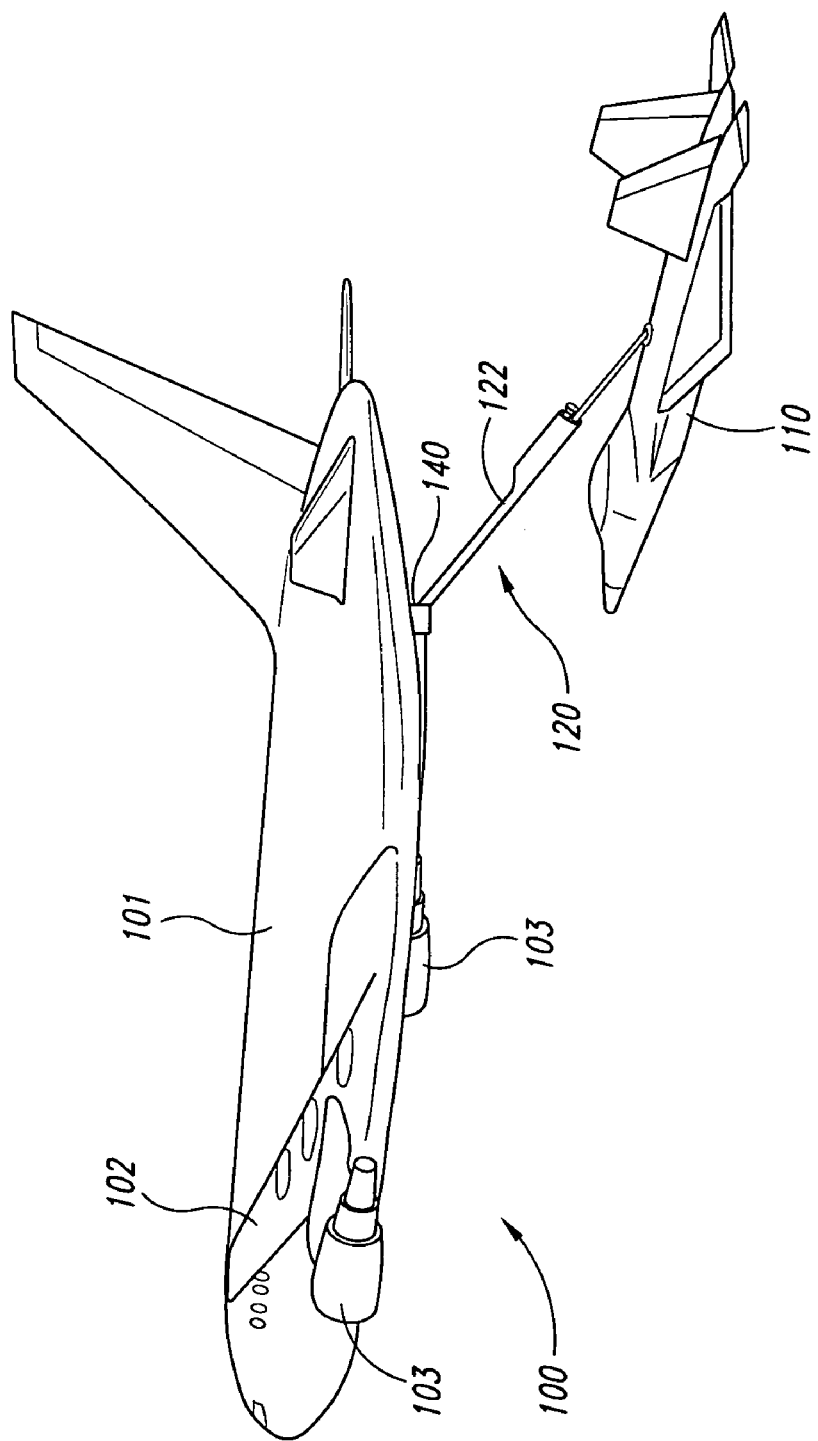
FIG. 1 is a partially schematic, isometric illustration of a tanker aircraft refueling a receiver aircraft with an aerial refueling system configured in accordance with an embodiment of the invention.

FIG. 1 illustrates a tanker aircraft 100 in the process of refueling a receiver aircraft 110 with an aerial refueling system 120 configured in accordance with an embodiment of the invention. The tanker aircraft 100 has a fuselage 101, wings 102, and one or more engines 103 (two are shown in FIG. 1 as being carried by wings 102). In other embodiments, the tanker aircraft 100 can have other configurations. In a particular aspect of the embodiment shown in FIG. 1, the aerial refueling system 120 can include a refueling boom 122 operably coupled to a boom mounting assembly 140 (shown schematically) carried by the tanker aircraft 100. The boom 122 does not include any boom aerodynamic control surfaces or airfoils (e.g., ruddevators, horizontal and vertical surfaces, and/or flow control surfaces) to control the boom 122. In lieu of "flying" the boom into the desired position using boom aerodynamic control surfaces, the boom mounting assembly 140 includes one or more powered actuators operably coupled to the boom 122 to control the lateral and vertical motion of the boom 122 during refueling operations. As discussed below, this arrangement can increase the operational refueling envelope of the aerial refueling system as compared with conventional refueling systems while reducing aerodynamic drag and system complexity.

Figure 2A:
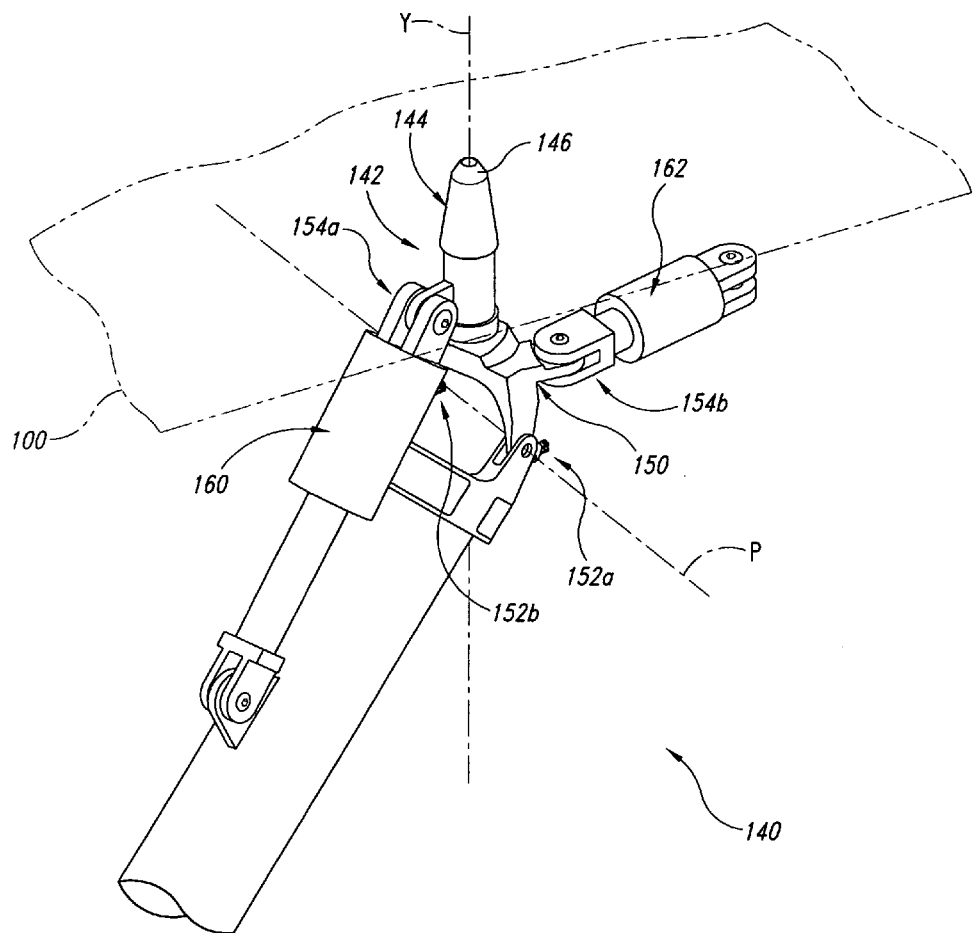
FIG. 2A is an isometric view of a boom mounting assembly of the aerial refueling system of FIG. 1 configured in accordance with an embodiment of the invention.

FIG. 2A is an isometric view of the boom mounting assembly 140 configured in accordance with an embodiment of the invention. The boom mounting assembly 140 can include a boom support 142 and one or more actuators positioned to control movement of the boom. The boom support 142 can include a first portion 144 and a second portion 150 rotatably attached to the first portion 144. The first portion 144 can include a pin 146 extending longitudinally along a first axis or yaw axis Y and positioned to be rotatably attached to the tanker aircraft 100 (shown schematically in broken lines). The second portion 150 can include one or more boom attachment portions 152 (two are shown as a first boom attachment portion 152a and a second boom attachment portion 152b). The first and second boom attachment portions 152a and 152b are aligned with each other along a second axis or pitch axis P that is generally normal to the first axis Y. The boom support 142 further includes one or more actuator attachment portions 154 (two are shown in FIG. 2A as a first actuator attachment portion 154a and a second actuator attachment portion 154b) where one or more actuators can be operably coupled to the boom support 142. In the illustrated embodiment, for example, a first actuator 160 is operably coupled to the first actuator attachment portion 154a and a second actuator 162 is operably coupled to the second actuator attachment portion 154b. As described in detail below, the first and second actuators 160 and 162 are configured to move the boom 122 about the first axis Y and the second axis P to desired positions of azimuth and elevation relative to the tanker aircraft 100. In alternative embodiments described below with respect to FIGS. 3A-4, the boom support 142 may have a different configuration and/or a different number of actuators may be coupled to the boom support.

Figure 2B:
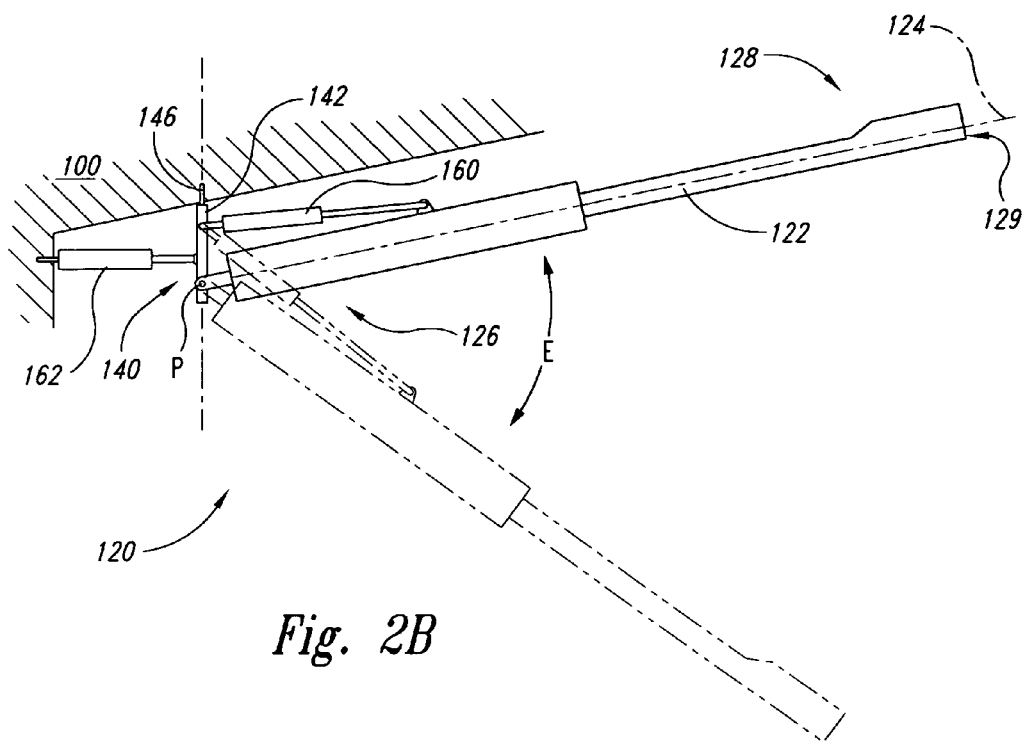
FIG. 2B is a partially schematic side view of the aerial refueling system of FIG. 1.

FIG. 2B is a partially schematic side view of the aerial refueling system 120 shown in FIG. 1 including the boom support 142 (shown partially schematically) described above with respect to FIG. 2A. The boom 122 can be elongated along a boom axis 124 and can include a first portion 126 proximate to the boom mounting assembly 140 and a second portion 128 at a distal end of the boom 122. The first portion 126 of the boom 122 can be carried by the boom mounting assembly 140 and/or the tanker aircraft 100 (shown partially schematically). The second portion 128 of the boom 122 can include one or more refueling couplers 129 configured to be received in a corresponding receptacle of the receiver aircraft 110 (FIG. 1).

The boom mounting assembly 140 is configured to movably attach the boom 122 to the tanker aircraft 100. In a particular aspect of this embodiment, the pin 146 of the boom support 142 can be rotatably attached to one portion of the tanker aircraft 100 and the second actuator 162 can be operably coupled to another portion of the tanker aircraft 100. The first actuator 160 can accordingly pivotably move the boom 122 about the pitch axis P (as shown by the arrow E) between a stowed position (shown in solid lines) and a deployed or operational position (shown in broken lines) at a different position of elevation relative to the tanker aircraft 100.

Figure 2C:
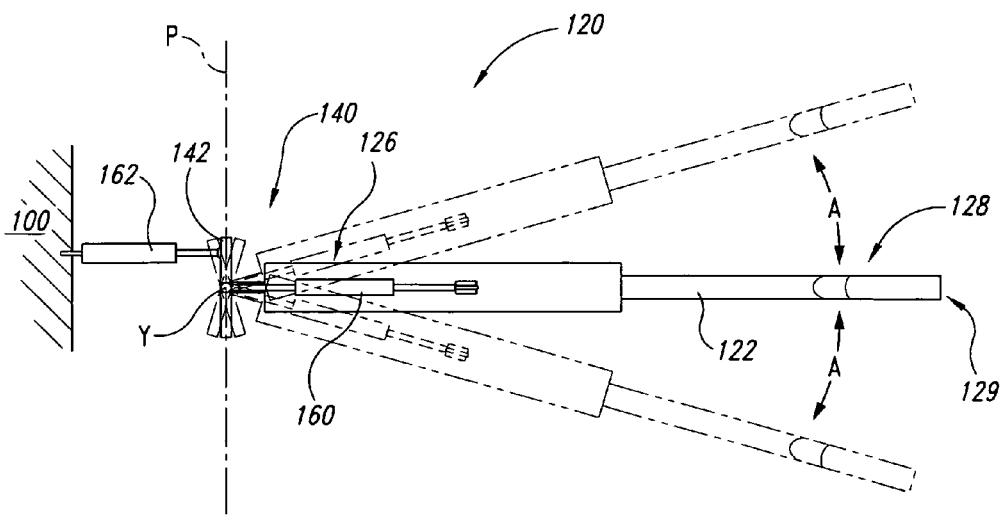
FIG. 2C is a partially schematic top plan view of the aerial refueling system of FIG. 2B.

FIG. 2C is a partially schematic top plan view of the aerial refueling system 120 shown in FIG. 2B. As best seen in FIG. 2C, the second actuator 162 can rotatably move the boom 122 about the yaw axis Y (as shown by the arrows A) from an initial position (shown in solid lines) to operational positions (shown in broken lines) at different positions of azimuth relative to the tanker aircraft 100. For example, extending the second actuator 162 can rotate the boom support 142 in a generally clockwise direction and, accordingly, move the boom 122 in a clockwise lateral direction. Likewise, retracting the second actuator 162 can rotate the boom support 142 in a generally counterclockwise direction and move the boom 122 in a counterclockwise lateral direction. In other embodiments, one or more additional second actuators 162 can be coupled to the boom support 142 to rotatably move the boom 122 about the yaw axis Y. For example, additional actuators can be used to provide a measure of redundancy or in situations where the actuators may have an uneven force distribution (i.e., exert more force in a first lateral direction than in a second lateral direction).

The first and second actuators 160 and 162 can include hydraulic, electrical, and/or pneumatic actuators. In the embodiment described above with respect to FIGS. 2A-2C, for example, the first and second actuators 160 and 162 are hydraulic actuators that may include linear rams or helical rotary actuators. In embodiments including electrical and/or pneumatic actuators, the actuators can include screw jack or recirculating ball-type drives. In other embodiments, the aerial refueling system 120 can include different types of actuators and/or the actuators may have different configurations.

The first and second actuators 160 and 162 proximate to the first portion 126 of the boom 122 can be operably coupled to a controller (not shown) via which an operator can steer the boom 122. An advantage of this feature is that the boom 122 does not have to be "flown" to the desired positions of azimuth and elevation relative to the tanker aircraft 100 using boom aerodynamic control surfaces. This feature can significantly improve controllability of the boom 122 because the operator can command the boom 122 to go to a desired location and the boom 122 will go to that location without being significantly limited or otherwise affected by flow fields, flow separation, and other aerodynamic phenomena.

In one aspect of the foregoing embodiments, the aerial refueling system 120 is configured such that the first and second actuators 160 and 162 are at least partially disengaged when the boom 122 is engaged with the receiver aircraft 110 (FIG. 1) for refueling. In this way, the boom 122 can move freely to any position up to the mechanical limits as the tanker aircraft 100 and receiver aircraft 110 move relative to each other during refueling operations. In several embodiments, however, the first and second actuators 160 and 162 can remain at least partially engaged to make minor corrections to compensate for boom bending and/or allow an operator to make other minor inputs during refueling. When the receiver aircraft 110 disengages from the boom 122 after refueling, active control of the boom 122 returns to the operator and the aerial refueling system 120 reactivates from its approximate disengagement position. In the case of hydraulic actuators, for example, the hydraulic ram internal pistons (not shown) mechanically follow the motion of the boom 122 and are in the proper position to hold the boom 122 in place once pressure within the actuators is reactivated. In the case of electrical actuators, a clutch may be used to at least partially disengage the first and second actuators 160 and 162. One advantage of this feature is that the boom 122 does not have to "relocate" itself upon activation, which can provide more precise control over the boom 122 during refueling operations. Another advantage of above-described features is that by at least partially disengaging the actuators 160 and 162 during refueling, the boom 122 will not become "pinned" between the tanker aircraft 100 and the receiver aircraft 110 or otherwise negatively restrict motion between the two aircraft during refueling. Allowing the boom 122 to flexibly move during refueling significantly reduces the potential for the boom 122 to become damaged and/or cause damage to the tanker aircraft 100 or receiver aircraft 110 during refueling.

Another advantage of the aerial refueling system 120 described above is reduced system complexity, weight, aerodynamic drag, and maintenance as compared with conventional aerial refueling systems. For example, the aerial refueling system 120 can eliminate the need for aerodynamic automatic load alleviation systems, boom snubbers, and hoist systems. Removal of these systems reduces overall system weight, complexity, and maintenance. The aerial refueling system 120 further significantly reduces the need for development and installation of complex and expensive boom flight controls and control systems.

Still another advantage of the aerial refueling system 120 is that the aerial refueling envelope of the system can be significantly larger than the refueling envelopes of conventional booms that rely on boom aerodynamic control surfaces. This can significantly increase the efficiency of refueling operations and allow refueling operations in a wider range of environments and conditions. For example, an aerial refueling envelope for the system 120 can be defined (e.g., range of motion, force required to move the boom at certain flight conditions, aircraft configuration, operational environment, etc.) before building the aerial refueling system 120 and the first and second actuators 160 and 162 can be sized accordingly to ensure that the resulting aerial refueling envelope meets the desired operational requirements.

Figure 3A:
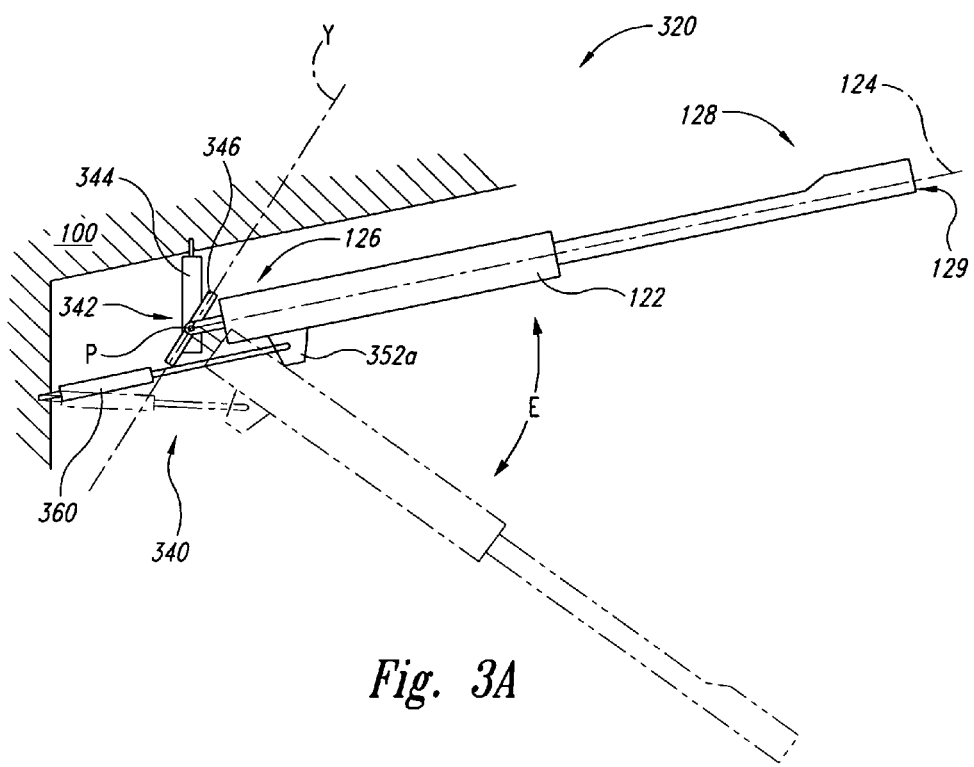
FIG. 3A is a partially schematic side view of an aerial refueling system configured in accordance with another embodiment of the invention.
Figure 3B:
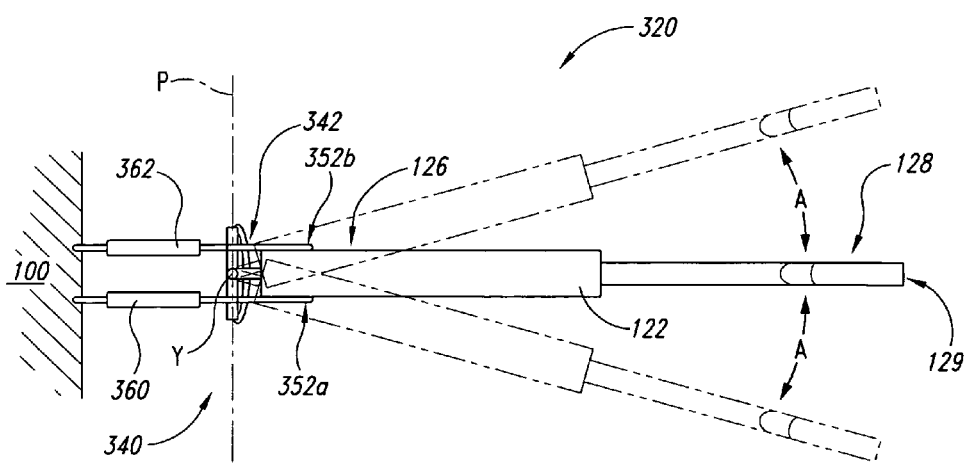
FIG. 3B is a partially schematic top plan view of the aerial refueling system of FIG. 3A.
Figure 3C:
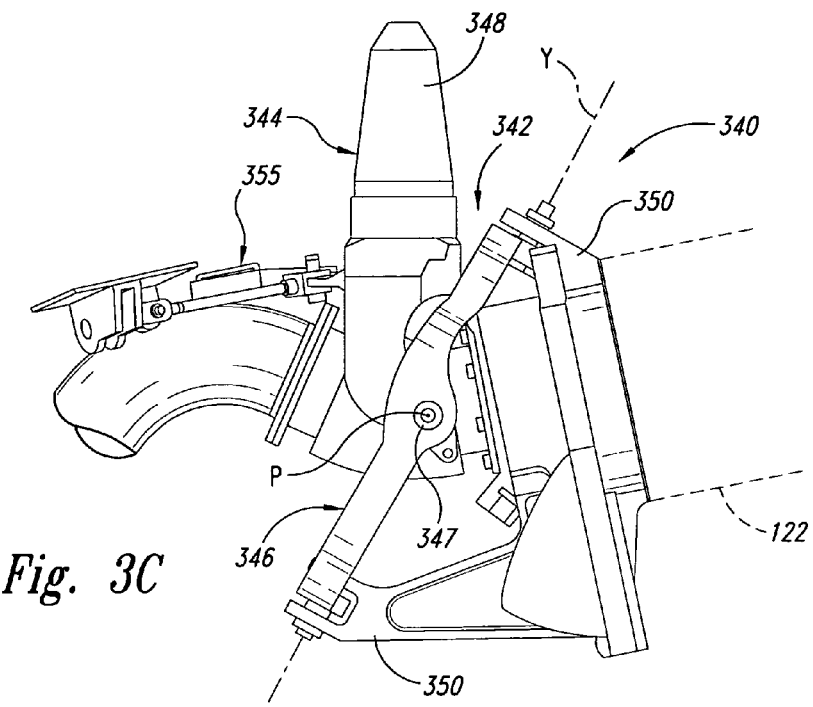
FIG. 3C is an isometric view of the boom mounting assembly of the aerial refueling system of FIGS. 3A and 3B.
Figure 4:
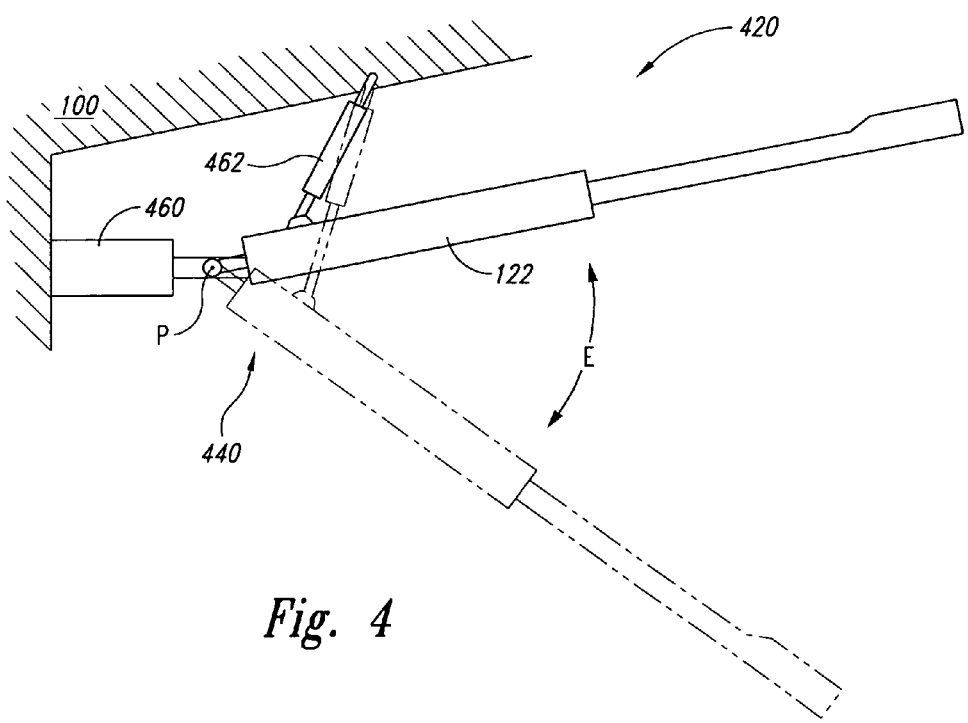
FIG. 4 is a partially schematic side view of an aerial refueling system configured in accordance with still another embodiment of the invention.

FIGS. 3A-4 illustrate aerial refueling systems configured in accordance with additional embodiments of the invention. The aerial refueling systems described below can be installed on the tanker aircraft 100 (FIG. 1) and include many of the same features and advantages of the aerial refueling system 120 described above with respect to FIGS. 2A-2C.

FIG. 3A, for example, is a partially schematic side cross-sectional view of an aerial refueling system 320 configured in accordance with another embodiment of the invention. The aerial refueling system 320 can include a boom mounting assembly 340 having a boom support 342 (shown schematically) attached to the tanker aircraft 100 (shown partially schematically) and carrying the boom 122. More specifically, the boom support 342 can include a first portion 344 fixedly attached to the tanker aircraft 100 and a second portion 346 pivotably coupled to the first portion 344. The second portion 346 extends longitudinally along the first axis Y and is pivotably movable about the second axis P. In this embodiment, the first axis Y is at least partially canted, rather than being generally vertical as described above with respect to FIGS. 2A-2C. The boom support 342 is described in more detail below with respect to FIG. 3C.

FIG. 3B is a partially schematic top plan view of the aerial refueling system 320 shown in FIG. 3A. Referring now to FIGS. 3A and 3B together, the aerial refueling system 320 further includes a first actuator 360 and a second actuator 362 (shown in FIG. 3B) operably coupled to the boom 122 at a first actuator attachment portion 352a and a second actuator attachment portion 352b (shown in FIG. 3B), respectively. The actuators 360 and 362 are configured to laterally and vertically move the boom 122 about the first axis Y and the second axis P to desired positions of azimuth and elevation relative to the tanker aircraft 100. For example, the first and second actuators 360 and 362 can pivotably move the boom 122 about the pitch axis P (as shown by the arrow E) between a stowed position (shown in solid lines) and a deployed or operational position (shown in broken lines) at a different position of elevation relative to the tanker aircraft 100.

As best seen in FIG. 3B, the first and second actuators 360 and 362 can extend and/or retract (either individually or in tandem) to rotatably move the boom 122 about the yaw axis Y (as shown by the arrows A) from an initial position (shown in solid lines) to operational positions (shown in broken lines) at different positions of azimuth relative to the tanker aircraft 100. Thus, when the first and second actuators 360 and 362 move together (i.e., in the same direction), they generally control movement of the boom about the pitch axis P, and when the first and second actuators 360 and 362 move separately (i.e., in opposite directions), they generally control movement of the boom about the yaw axis Y. The actuators 360 and 362 can be hydraulic, electrical, and/or pneumatic actuators and can be generally similar to the actuators 160 and 162 described above. In other embodiments, additional actuators may be included and/or the actuators may have different configurations.

FIG. 3C is an isometric view of the boom mounting assembly 340 and the boom support 342. The first portion 344 of the boom support 342 can include a pin 348 configured to be rigidly attached to the tanker aircraft 100 (as illustrated in FIG. 3A) with one or more links 355. The second portion 346 of the boom support 342 includes a boom attachment portion 350 configured to be attached to the boom 122 (shown in broken lines). The second portion 346 of the boom support 342 can be pivotably attached to the first portion 344 at an attachment portion 347 and, as discussed above, the actuators 360 and 362 (shown above in FIGS. 3A and 3B) can pivotably move the boom 122 about the attachment portion 347 (i.e., about the pitch axis P) and rotatably move the boom 122 (and the boom attachment portion 350) about the yaw axis Y.

FIG. 4 is a partially schematic side cross-sectional view of an aerial refueling system 420 configured in accordance with still another embodiment of the invention. The aerial refueling system 420 can include a boom mounting assembly 440 (shown schematically) coupled to the tanker aircraft 100 (shown partially schematically) and carrying the boom 122. The system 420 can further include a first actuator 460 and a second actuator 462 operably coupled to the boom 122 to move the boom 122 relative to the tanker aircraft 100. The actuators 460 and 462 in the system 420 differ from those described above in that the first actuator 460 can include a rotary actuator and the second actuator 462 can include a pitch ram. In other embodiments, however, the first and second actuators 460 and 462 can include other types of actuators. The first actuator 460 is configured to move the boom 122 (e.g., in an orbital motion) to desired positions of azimuth relative to the tanker aircraft 100, and the second actuator 462 is configured to pivotably move the boom 122 about the pitch axis P (as shown by the arrow E) between a stowed position (shown in solid lines) and a deployed or operational position (shown in broken lines) at a different position of elevation relative to the tanker aircraft 100.

From the foregoing, it will be appreciated that specific embodiments of the invention have been described herein for purposes of illustration, but that various modifications may be made without deviating from the invention. For example, the aerial refueling systems described above may include different boom supports, a different number of actuators, and/or the actuators may have a different configuration. Aspects of the invention described in the context of particular embodiments may be combined or eliminated in other embodiments. For example, the aerial refueling systems may include more than one type of actuator in a single system (e.g., hydraulic and electrical or pneumatic actuators in the same system). Furthermore, the actuators and/or boom supports described above with respect to a particular embodiment may be used within a different embodiment. Further, while advantages associated with certain embodiments of the invention have been described in the context of those embodiments, other embodiments may also exhibit such advantages, and not all embodiments need necessarily exhibit such advantages to fall within: the scope of the invention. Accordingly, the invention is not limited except as by the appended claims.

We claim:

1. An aerial refueling system, comprising:
   a movable aerial refueling boom configured to be carried by an aerial refueling aircraft;
   a boom support carried by the aerial refueling aircraft, wherein the boom support includes a first portion positioned to rotatably move about a first axis and a second portion at least partially aligned with a second axis generally normal to the first axis; and
   two or more actuators operably coupled to at least one of the boom support and the boom to control motion of the boom relative to the refueling aircraft, wherein the two or more actuators include (a) a first actuator operably coupled to the boom support and positioned to rotatably move the boom about the first axis, and (b) a second actuator operably coupled to the boom support and positioned to pivotably move the boom about the second axis.

2. The system of claim 1 wherein the first axis is a yaw axis and the second axis is a pitch axis.

3. The system of claim 1 wherein:
   the two or more actuators operably coupled to at least one of the boom support and the boom include (a) a first actuator carried by the first portion of the boom support and positioned to move the boom about a pitch axis, and (b) a second actuator and a third actuator carried by the second portion of the boom support and positioned to move the boom about a yaw axis generally normal to the pitch axis.

4. The system of claim 1 wherein the boom does not include any boom aerodynamic control surfaces.

5. The system of claim 1 wherein the two or more actuators include hydraulic actuators.

6. The system of claim 1 wherein the two or more actuators include pneumatic actuators.

7. The system of claim 1 wherein the two or more actuators include electrical actuators.

8. The system of claim 1, further comprising the aerial refueling aircraft.

9. The system of claim 1 wherein the boom is elongated along a boom axis and includes a first portion coupled to the refueling aircraft and a second portion positioned to mate with a receiver aircraft, and wherein the two or more actuators are coupled to the boom proximate to the first portion of the boom and control motion of the boom from the first portion of the boom.

10. An aerial refueling system, comprising:
    a tanker aircraft;
    a boom mounting assembly carried by the tanker aircraft, the boom mounting assembly including a boom support having a first portion positioned to rotatably move about a first axis and a second portion at least partially aligned with a second axis generally normal to the first axis;
    a movable aerial refueling boom carried by at least one of the boom support and the tanker aircraft, wherein the boom does not include any boom aerodynamic control surfaces; and
    one or more actuators operably coupled to at least one of the boom support and the boom to control motion of the boom relative to the tanker aircraft, wherein the one or more actuators carried by the boom support include (a) a first actuator operably coupled to the boom support and positioned to rotatably move the boom about the first axis, and (b) a second actuator operably coupled to the boom support and positioned to pivotably move the boom about the second axis.

11. The system of claim 10 wherein:
    the one or more actuators carried by the boom support include (a) a first actuator carried by the first portion of the boom support and positioned to move the boom about a first axis, and (b) a second actuator and a third actuator carried by the second portion of the boom support and positioned to move the boom about a second axis generally normal to the first axis.

12. The system of claim 10 wherein the one or more actuators include hydraulic actuators, the hydraulic actuators including linear rams or helical rotary actuators.

13. The system of claim 10 wherein the one or more actuators include pneumatic actuators.

14. The system of claim 10 wherein the one or more actuators include electrical actuators, the electrical actuators including screw jack or recirculating ball-type drives.

15. A method for refueling aircraft in flight, the method comprising:
    deploying a generally rigid aerial refueling boom without any boom aerodynamic control surfaces from a refueling aircraft; and
    controlling a position of the boom relative to the refueling aircraft by controlling one or more actuators operably coupled to at least one of the boom and a boom support carrying the boom, wherein controlling one or more actuators includes (a) moving the boom about a first axis with a first actuator operably coupled to the boom support, and (b) moving the boom about a second axis generally normal to the first axis with a second actuator operably coupled to the boom support.

16. The method of claim 15 wherein controlling a position of the boom relative to the refueling aircraft includes controlling the position of the boom without the use of any boom aerodynamic control surfaces.

17. The method of claim 15 wherein:
deploying a generally rigid aerial refueling boom includes deploying a boom having a first portion proximate to the refueling aircraft and a second portion at a distal end of the boom; and
controlling a position of the boom includes controlling one or more actuators operably coupled to the first portion of the boom.

18. The method of claim 15, further comprising guiding the boom into a coupling position with a receiver aircraft using the one or more actuators.

19. The system of claim 1 wherein the first actuator is a rotary actuator and the second actuator is a pitch ram.

20. The system of claim 1 wherein the first actuator extends lengthwise along a first actuator axis and the second actuator extends lengthwise along a second actuator axis, and wherein the first actuator axis and the second actuator axis are generally parallel with each other.

21. The method of claim 15 wherein controlling a position of the boom relative to the refueling aircraft by controlling one or more actuators includes controlling a position of the boom with one or more hydraulic actuators, pneumatic actuators, or electrical actuators.

* * * * *